United States Patent [19]

Borg et al.

[11] 4,361,680

[45] Nov. 30, 1982

[54] BLOCK COPOLYETHERAMIDES-BASED THERMOFUSIBLE ADHESIVE COMPOSITIONS

[75] Inventors: Patrick Borg, Beaumontel; Gerard Deleens, Beaumesnil, both of France

[73] Assignee: Ato Chimie, Courbevoie, France

[21] Appl. No.: 331,691

[22] Filed: Dec. 17, 1981

[30] Foreign Application Priority Data

Jan. 5, 1981 [FR] France .................................. 81 00035

[51] Int. Cl.$^3$ ...................... C08F 283/04; C08G 69/48
[52] U.S. Cl. ................................... 525/420; 525/434; 525/437; 528/288
[58] Field of Search ................ 528/288; 525/420, 434, 525/437

[56] References Cited

U.S. PATENT DOCUMENTS

| | | | |
|---|---|---|---|
| 3,636,135 | 1/1972 | Garforth | 525/434 |
| 3,650,999 | 3/1972 | Martins et al. | 528/288 |
| 3,923,925 | 12/1975 | Schneider et al. | 525/420 |
| 4,196,108 | 4/1980 | Hinze et al. | 525/420 |
| 4,208,493 | 6/1980 | Deleens et al. | 525/420 |
| 4,307,227 | 12/1981 | Meyer et al. | 528/288 |

*Primary Examiner*—Lucille M. Phynes
*Attorney, Agent, or Firm*—Burgess, Ryan and Wayne

[57] ABSTRACT

The present invention relates to a new thermofusible adhesive based on certain block copolyetheramides resulting from the copolycondensation of polyamide blocks with reactive extremities with polyether blocks with reactive extremities.

11 Claims, No Drawings

BLOCK COPOLYETHERAMIDES-BASED THERMOFUSIBLE ADHESIVE COMPOSITIONS

The present invention relates to a novel application of certain block copolyetheramides and concerns, more particularly, a copolyetheramide-based thermofusible adhesive as well as thermofusible adhesive compositions containing them.

It concerns, particularly, adhesives called "hot melts" (HMA), i.e. thermoplastic materials having adhesive properties, solid at ambient temperature (100% dry extract) and adapted to melt when heated. These "hot melt" adhesives are applied hot, usually at temperatures comprised between 140° and 200° C., in molten state and their main advantage is that they require no solvent for their application, thus eliminating ignition and toxicity problems which can occur with other adhesives.

A large number of existing thermofusible adhesives are known and the majority of them are already used in the commercial field. Accordingly, are known adhesives formed of:
ethylene copolymers {EVA type (ethylene-vinyl acetate) or EEA type (ethylene-ethylacetate)};
fatty acid-based polyamides {for example, dilinoleic acid and hexamethylene diamine};
copolymers from monomers {such as caprolactam, AH salt, diamine hexamethylene adipate, diamine hexamethylene azelate, 11-amino undedecanoic acid, lauryl lactam};
copolyesters {terephtalic or isophtalic acid types or their mixtures combined with glycols such as hexane 1–6, diols, etc.}.

These existing adhesives, while satisfactory for certain applications, have, in numerous cases, certain drawbacks. Thus:
ethylene copolymers, while having the advantage of being most compatible with the various HMA constituents, have the drawback of displaying a relatively low crystalline melting point, which thus gives rise to a low thermal resistance of the bonds obtained;
fatty acid-based polyamides:
for low or average molecular weights, display a low viscosity and thus have the advantage of allowing a good wetting of the surfaces to be adhered together and thus an excellent ease of application; however, their relatively low crystalline melting points lead to a limited thermal resistance of the obtained bonds {such is the case of Versamid and Versalon®}, (trade names belonging to the company GENERAL MILLS, covering products formed of dilinoleic acid and hexamethylene diamine);
for high molecular weights, display a higher melting point and thus a better temperature resistance; however, their very high viscosity leads to application difficulties (such is the case of Milvex®), on the one hand, and to applications restricted to certain types of materials, on the other hand;
copolyamides display a high molten state viscosity and give rise to difficulties, indeed impossibilities, of application in any form other than powder; then display, furthermore, a marked elasticity and give rise to a certain incompatibility with the thermofusible adhesive additives;
copolyesters:
for low viscosities ($\eta < 0.4$), display the drawback of being fragile and only slightly adhesive;
for high viscosities ($\eta < 0.9$) display the drawback of hardly melting (thus giving rise to wetting and application problems);
for average viscosities ($0.4 < \eta < 0.85$) requiring very high optimal application temperatures and display, furthermore, the drawback of being too sensitive to hydrolysis and having feeble solvent properties.

The thermofusible adhesive according to the invention has the advantage of having adhesive strengths over a wide range of temperatures and a general purpose-type adhesiveness, resulting from the fact that it adheres to a large number of materials (metals, glass, plastic materials, wood, textile materials, leather, cardboard, etc), on the one hand, and that it is compatible with other constituents usually contained in adhesive compositions, on the other hand.

The present invention concerns a thermofusible adhesive formed of the product obtained from copolycondensation of polyamide blocks having reactive extremities with polyether blocks having reactive extremities, such as, among others:
1. Polyamide blocks having diacid chain ends with either polyetherdiol blocks or polyetheramines (through cyanoethylation and hydrogenation of polyetherdiol);
2. Polyamide blocks having diamino chain ends with polyether blocks having carboxylic chain ends.

According to one embodiment, the present invention concerns a thermofusible adhesive formed of a product obtained from copolymerisation of a α-ω dicarboxylic polyamide or copolyamide having a molecular weight comprised between 300 and 15,000, and preferably comprised between 800 and 5.000, amounting to 95 to 15% by weight, and a α-ω dihydroxy aliphatic polyoxyalkylene having a molecular weight of 100 to 6.000, and preferably comprised between 200 and 3.000, amounting to 5 to 85% by weight, the said product having a melting point comprised between 80° and 210° C., and preferably between 100° and 150° C., and a molten state viscosity of 10 to 2.000 Pa.sec at 200° C.

According to another embodiment of the invention, the said product obtained from condensation comprises 70 to 30% of the said polyamide or copolyamide and 30 to 70% of the said α-ω dihydroxy polyoxyalkylene.

The said thermofusible adhesive is preferably a block polyether esteramide formed of CoPA 6.11/PPG/PTMG, PA 12/PTMG or CoPA 6.12/PPG.

Is meant in the present description and the claims to which it gives rise, by:
PPG: polyoxypropyleneglycol
PTMG: polyoxytetramethyleneglycol
PA: polyamide
CoPA: copolyamide.
6, 11 or 12: respectively -6, 11 or 12 polyamide.
The advantages of these sequenced CoPA 6.11/PPG/PTMG, CoPA 6.12/PPG or 12/PTMG polyetheresteramides are the following:
high melting point (>120° C.) for an appropriate molten state viscosity (>3.000 Pa.sec);
good adhesion to metal (aluminium, steel) up to 100°–200° C., glass and certain engineering thermoplastics (polycarbonate and PBT); good compatibility with the majority of thermofusible adhesives, which allows the viscosity to be diminished and a certain proportion (25%) of the additive to preserve its adhesiveness at high temperature (100° C.);

good resistance of the bonds to hydrolysis at ambient temperature.

The present invention also concerns thermofusible adhesive compositions containing the said product obtained from condensation in association with the previously specified adhesives.

The block polyetheresteramides can be used alone as thermofusible adhesives for the binding of structures made of very diverse materials, such as wood, glass, textiles, metals (steel, aluminium, ...) plastic materials (PVC, polycarbonate, PBT, ...) and leather. The thus obtained bonds give excellent performances from the point of view of adhesion, cohesion, cold resistance and thermal resistance, (120° C., even up to 150° C.).

The sequenced polyetheresteramides can be used in formulation with a certain number of ingredients, for example, ethylene copolymer (EVA, ...) tackifying resins and certain types of waxes, in order to obtain thermofusible adhesives of lower molten state viscosity, and having good adhesion and cohesion properties, as well as cold resistance and thermal resistance properties (up to 100° C.). These adhesives can be used in the binding of structures, as well as in the most traditional thermofusible applications, namely packing (sealing of crates, boxes, ...), book-binding, edge or rim veneering (stratified laminate, PVC, polyesters or wood edges or rims).

Other advantages and characteristics of the present invention will become evident from reading through the following description and examples given by way of non-limitative illustration.

Examples 1 to 5 herein-under concern the preparation of A to E block copolyetheresteramides according to the invention, carried out according to the process described in the following French Pat Nos.: 74 18913, 77 39790, 79 02618 and 77 26678, given here by way of reference.

EXAMPLE 1

Preparation of CoPA 6.11/PPG/PTMG

A prepolymer is formed from:
17.6 kg caprolactam
19.4 kg 11-amino-undecanoic acid
2.5 kg adipic acid.

The obtained prepolymer, formed of 50% PA 6 and 50% PA 11 has a molecular weight of 2.300. Thereafter, are added to 23 kg of this prepolymer, 2.5 kg PTMG (molecular weight 1.000) and 7.5 kg PPG (molecular weight 1.000) as well as 0.3% zirconium butylate and an antioxidant; then polycondensation is carried out at a temperature of about 260° C.

Product 1 obtained has the properties indicated in TABLE I herein-below.

EXAMPLE 2

Preparation of PA 11/PPG/PTMG

A prepolymer is formed from:
30 kg 11-amino-undecanoic acid
5.7 kg apidic acid

The obtained polymer has a molecular weight of 850. Thereafter, are added to 8.8 kg of this prepolymer, 10 kg PTMG (molecular weight 2000) and 10 kg PPG (molecular weight 2000) as well as zirconium butylate and an antioxidant; polycondensation is then carried out at a temperature of 260° C.

TABLE I

| PRODUCT | EXAMPLE | COMPOSITION | MELTING POINT (°C.) | SOFTENING POINT | INHERENT VISCOSITY | MELTED STATE VISCOSITY (Pa.sec. at 200° C.) |
| --- | --- | --- | --- | --- | --- | --- |
| A | 1 | CoPA 6.11/PPG/PTMG | 122 | 153 | 1.00 | 170 |
| B | 2 | PA 11/PPG/PTMG | 153 | 156 | 0.95 | 34 |
| C | 3 | PA 12/PTMG | 144 | 157 | 1.50 | 335 |
| D | 4 | PA 6/PTMG | 190 | 192 | 1.02 | 80 |
| E | 5 | CoPA 6.12/PPG | 138 | 156 | 1.00 | 150 |

Product B obtained has the properties indicated in TABLE I herein-above.

EXAMPLE 3

Preparation of PA 12/PTMG: Product C

A prepolymer is formed from:
18 kg dodecalactam.
3.8 kg adipic acid.

To 8.8 kg of this prepolymer (which has a molecular weight of 850), are added 20.3 kg PTMG (molecular weight 2000), zirconium butylate and an antioxidant; polycondensation is then carried out at 260° C.

Product C obtained has the properties indicated in TABLE I, herein-above.

EXAMPLE 4

Preparation of PA 6/PTMG

A prepolymer is formed from:
30 kg caprolactam.
6.225 kg adipic acid.

To 9 kg of this prepolymer (molecular weight 850) are added 22 kg PTMG (molecular weight 2000), zirconium butylate and an antioxidant; polycondensation is then carried out at 260° C.

Product D obtained has the properties indicated in TABLE I herein-above.

EXAMPLE 5

Preparation of CoPA 6.12/PPG

A prepolymer is formed from the following:
14 kg caprolactam.
14 kg dodecalactam.
1.90 kg adipic acid.

The prepolymer obtained, formed from 50% PA 6/50% PA 12-based copolyamide has a molecular weight of 2300. To 23 kg of this prepolymer is added, 10 kg polypropyleneglycol (molecular weight 1000) as well as an antioxidant and a catalyst; polycondensation is then carried out at 260° C.

Product E obtained has the properties indicated in TABLE I, hereinabove.

EXAMPLE 6

Tests are carried out in order to determine:

the adhesive properties with respect to the various supports;

the adhesive properties in function of temperature;

compatibility with various standard constituents of adhesives of products A and E, and to compare these properties with those of products commercially available.

Determination of Adhesiveness on Various Supports

The adhesiveness is measured by peeling resistance tests. This resistance has no stress character since it concerns the ratio of a force to a length. In fact, is determines the necessary strength to cause the lengthwise rupture of the test sample and which is lower than the force initiating the rupture. It is known that this peeling resistance test can be carried out by two methods:

peeling method in T, which comprises pulling on the two layers along two directions perpendicular to the support;

peeling method at 180°, which comprises pulling on one of the layers along a direction parallel to that of the support.

TABLE II, herein-below, indicates the results of the peeling tests carried out on various supports, with different adhesives, respectively: Versalon 2140 ®, Platamid H005 ®, Grilesta 6506 ® and products C and E of Examples 3 and 5 herein-above.

A. aluminium-aluminium (alu-alu)

Two aluminium strips 2 cm wide and 8 cm long are stuck together under a heating press at 200° C. under a pressure of 4 bars for 5 minutes. The peeling force at 90° is determined by the traction in T method, with the use of a dynamometer, the jaws being pulled apart at a speed of about 50 mm/mn.

B. steel-steel

Two steel sheets are stuck together in the same conditions as previously specified and the peeling force is determined by the traction in T method.

C. glass-aluminium (glass-alu)

A plate of glass and an aluminium sheet are stuck together in the same conditions as previously specified and the peeling force is determined by the traction in T method at 180°.

D. polycarbonate-aluminium (PCa/Alu)

An aluminium sheet is stuck on to the polycarbonate under a heating press at 120° C. under a pressure of 4 bars for 5 minutes. The peeling force is thereafter determined by traction method at 180°.

E. polbutylene-terephtalate-aluminium (PBT-alu)

Two aluminium sheets and polybutylene-terephtalate are stuck together at 160° under a pressure of 4 bars for 5 minutes.

TABLE II

| Support | Peeling force (daN/cm) Adhesive | | | | |
|---|---|---|---|---|---|
| | Alu—alu | Steel—steel | Glass-alu | PCa-alu | PTB/alu |
| VERSALON 2140 ®* | 0.5 | 0.2 | 1.6 | 1.5 | 1.25 |
| PLATAMID H 005 ®** | 1.5 | 1.0 | 1.6 | 0.9 | 0.1 |
| GRILESTA 6506 ®*** | 1.5 | — | 1.45 | 1.9 | 1.9 |
| C (example 3) | 1.5 | 1.5 | 2.5 | 2.5 | 2.1 |
| E (example 5) | 2.5 | 2.0 | 2.0 | — | — |

*VERSALON 2140: linoleic acid-based polyamide and HMD
**PLATAMID H 005: 6/6 6/12 copolyamide sold by the company Plate-Bonn
***GRILESTA 6506: terphtalic acid + isophtalic acid + butane 1-4 diol sold by the company Emser-Werke The peeling force is thereafter determined at 180°. The results obtained are indicated in TABLE II, herein-above.

It should be noted that the adhesion of the products according to the invention is equal to or higher than that of the products in the state of the art.

EXAMPLE 7

Determination of Adhesiveness as a Function of Temperature

On an aluminium-aluminium bonds prepared according to method (a) of Example 6, peeling force is determined at various temperatures, different adhesives being used.

The results obtained are indicated in TABLE III, herein-below.

It is noted that the thermal resistance of bonds according to the invention is higher than than of the products of the state of the art. Moreover, when tests are carried out at −20° and −30° C., it is noted that products A, C and E according to the invention have, furthermore, a satisfactory adhesion.

EXAMPLE 8

Determination of the Compatibility with Various Standard Constituents of Thermofusible Adhesives Compatibility tests are carried out on the following substances, given under their trademarks, the name in brackets being that of the company which markets said product:

50–52 paraffin ® (Total);
polyethylene A-C 629 ® wax (Allied Chemical);
colophane ester: Foral 85 ® (Hercules)
terpene-phenol resin: Dertophane T ® (DRT)
an aromatic alkyl petrol resin: Hercures AR 100 ® (Hercules)
ethylene-vinyl acetate copolymer: Elvax 220 ® (Dupont).

TABLE III

| Adhesive | Peeling force (daN/cm) Temperature °C. | | | | | | |
|---|---|---|---|---|---|---|---|
| | 20° C. | 40° C. | 60° C. | 80° C. | 100° C. | 120° C. | 140° C. |
| VERSALON 2140 | 0.5 | 0.3 | 0.25 | — | — | — | — |
| PLATAMID H 005 | 1.5 | 1.15 | 0.75 | 0.7 | 0.7 | 0.1 | — |
| GRILESTA 6506 | 1.5 | 1.2 | 0.9 | 0.8 | 0.6 | — | — |
| A (example 1) | 1.25 | 1.0 | 0.95 | 0.85 | 0.7 | 0.6 | — |
| C (example 3) | 1.5 | 1.45 | 1.45 | 1.3 | 0.8 | 0.45 | — |
| E (example 5) | 2.5 | 2.3 | 2.0 | 1.5 | 1.1 | 0.15 | 0.5 |

Compatibility tests are carried out on a 70/30 polyamide-additive blend. The results obtained, determined on the basis of limpidity or clouding of the blend obtained are indicated in TABLE IV herein-below.

EXAMPLE 9

Determination of the Adhesiveness of Various Compositions at Temperature

It is possible, in function of the tackifying waxes or resins used, to obtain compositions having a lower viscosity while displaying a satisfactory thermal resistance of the bond.

The tests are carried out on two aluminium sheets stuck together in the same conditions as those described in the method according to Example 6.

The peeling force is thus determined in function of temperature The results obtained are set out in TABLE V, herein-below.

The results of the tests carried out show surprising and unexpected advantages resulting from the use of thermofusible adhesives according to the invention, namely:
- their general purpose character, this use covering adhesion to all materials;
- their compatibility with additives currently used in thermofusible adhesive compositions;
- their resistance over a wide temperature range.

TABLE IV

| | Compatibility (C) or Incompatibility (I) Adhesive | | | |
|---|---|---|---|---|
| Addition agent | VERSALON 2140 | PLATAMID H 005 | Product B (example 2) | Product C (example 3) |
| Paraffin | I | I | I | I |
| Wax A-C 629 | I | I | C | C |
| Wax A-C 8 | I | I | I | C |
| Foral 85 | C | I | C | C |
| Dertophene T | C | I | C | C |
| Hercures AR 100 | I | I | I | C |
| Elvax 220 | C | C | C | C |

TABLE V

| | Viscosity at 200° C. | Peeling forces (daN/cm) | | | |
|---|---|---|---|---|---|
| | Pa.sec | 20° C. | 40° C. | 80° C. | 100° C. |
| B (example 2) | 34 | 1.3 | 1.0 | 0.85 | 0.35 |
| B/A-C 9 (90/10) | 21 | 1.2 | 0.75 | 0.30 | 0.15 |
| C (example 3) | 335 | 1.5 | 1.45 | 1.3 | 0.8 |
| C Dertophene 7 (70/30) | 75 | 1.4 | 0.9 | 0.5 | 0.3 |
| E (example 5) | 150 | 2.5 | 2.0 | 1.5 | 1.1 |
| E/Foral 85 (70/30) | 90 | 2.5 | 1.7 | 0.9 | 0.7 |
| Grilesta 6506 | 105 | 1.5 | 1.45 | 1.3 | 0.8 |
| Grilesta/ Dertophene 7 (70/30) | 50 | 0.6 | — | — | — |

Of course, it is understood that the present invention is in no way limited to the examples and embodiments described herein-above; it can be adapted to numerous variations available to the man skilled in the art, according to the applications foreseen and without departing from the spirit of the invention.

The methods used for determining the various physical properties mentioned are the following:
melting point: determination by thermal differential analysis;
softening point: determination by the method known as ball and ring method (standard ASTM E 28);
inherent viscosity: determination at 25° C. in solution of 0.5% by weight in metacresol;
molten state viscosity: measured with a coaxial cylindrical RHEOMAT 30 viscosimeter, mobile C and shearing speed of 3.50 sec$^{-1}$, manufactured by the Swiss company CONTRAVES.

We claim:

1. As a novel industrial product, a thermofusible adhesive, formed of the product obtained from copolycondensation of polyamide blocks having reactive extremities with polyether blocks having reactive extremities such as, among others:
   (a) polyamide blocks having diacid chain ends with either polyether diol blocks or polyetherdiamine blocks (by cyanoethylation and hydrogenation of polyether diols) having a molecular weight comprised between 300 and 15.000);
   (b) polyamide blocks having diamine chain ends with polyether blocks having carboxylic chain ends with a molecular weight of 100 to 6000;

2. Thermofusible adhesive according to claim 1, in which said adhesive is formed of the product obtained from the copolycondensation of 95 to 15% by weight of a α-ω dicarboxylic polyamide or copolyamide, and of 5 to 85% by weight of an aliphatic α-ω dihydroxy polyoxyalkylene, the said product having a melting point comprised between 80° and 210° C.

3. Thermofusible adhesive according to claim 1, in which the obtained condensation product has a molten state viscosity comprised between 10 and 2000 Pa.sec at 200° C.

4. Thermofusible adhesive according to one of claims 1 to 3, in which the melting point of the said obtained condensation product is comprised between 100° and 150° C.

5. Thermofusible adhesive according to one of claims 1 to 3, in which the molecular weight of the said polyamide or copolyamide is comprised between 800 and 5000.

6. Thermofusible adhesive according to one of claims 1 to 3, in which the molecular weight of the said α-ω dihydroxy polyoxyalkylene is comprised between 200 and 3000.

7. Thermofusible adhesive according to one of claims 1 to 3, in which the said condensation product obtained comprises 70 to 30% of the said α-ω dihydroxy polyoxyalkylene.

8. Thermofusible adhesive according to one of claims 1 to 3, in which the said thermofusible adhesive is a block polyetheresteramide formed of CoPA 6.11/PPG/PTMG.

9. Thermofusible adhesive according to one of claims 1 to 3, in which the said thermofusible adhesive is a block polyetheresteramide formed of CoPA 6.12/PPG.

10. Thermofusible adhesive according to one of claims 1 to 3, in which the said thermofusible adhesive is a block polyetheresteramide formed of Pa 12/PTMG.

11. Thermofusible adhesive composition containing the thermofusible adhesive according to any one of claims 1 to 3, in association with any suitable additive containing one or several of the compounds belonging to the following group:

- 50–52 paraffin of the French company TOTAL;
- polyethylene wax sold under the commercial denomination A-C8 ® of Allied Chemical;
- polyethylene wax sold under the commercial denomination A-C629 ® of Allied Chemical;
- colophane ester sold under the commercial denomination Foral 85 ® of Hercules;
- phenol-terpene resin sold under the commercial denomination Dertophene T ® of DRT;
- aromatic alkyl petrol sold under the commercial denomination Hercures 100 ® of Hercules;
- ethylene-vinyl acetate copolymer solder under the commercial denomination Elvax 220 ® of Dupont.

* * * * *